United States Patent [19]

Okazoe et al.

[11] Patent Number: 5,662,794
[45] Date of Patent: Sep. 2, 1997

[54] SOLID-LIQUID SEPARATOR AND WET FLUE GAS DESULFURIZATION APPARATUS

[75] Inventors: Kiyoshi Okazoe; Atsushi Tatani; Taku Shimizu, all of Tokyo; Naohiko Ukawa, Hiroshima, all of Japan

[73] Assignee: Mitsubishi Jukogyo Kabushiki Kaisha, Tokyo, Japan

[21] Appl. No.: 518,500

[22] Filed: Aug. 23, 1995

[30] Foreign Application Priority Data

Aug. 29, 1994 [JP] Japan .................. 6-203153

[51] Int. Cl.⁶ .................................. B01D 53/34
[52] U.S. Cl. .................. 210/151; 210/188; 210/207; 210/523; 210/540; 55/233; 55/385.1; 55/430; 422/172; 422/262; 422/273
[58] Field of Search ............... 210/242.3, 242.4, 210/523, 525, 538, 540, 202, 205, 207, 208, 150, 151, 188, 408, 413; 55/233, 385.1, 430; 422/172, 212, 273

[56] References Cited

U.S. PATENT DOCUMENTS

| 1,379,176 | 5/1921 | Foster | 210/523 |
|---|---|---|---|
| 1,860,819 | 5/1932 | Schamberger | 210/523 |
| 3,546,112 | 12/1970 | Will et al. | 210/242.4 |
| 3,612,277 | 10/1971 | Van Stavern et al. | 210/523 |
| 3,700,107 | 10/1972 | Flaviani | 210/242.3 |
| 3,702,297 | 11/1972 | Maksim, Jr. | 210/242.4 |
| 3,951,735 | 4/1976 | Kondo et al. | 162/133 |
| 3,968,041 | 7/1976 | De Voss | 210/242.3 |
| 5,397,549 | 3/1995 | Newman | 423/235 |

FOREIGN PATENT DOCUMENTS

| 0 534 458 | 3/1993 | European Pat. Off. . |
| 3834982 | 4/1990 | Germany . |
| 2 163 417 | 2/1986 | United Kingdom . |
| WO89/01820 | 3/1989 | WIPO . |

*Primary Examiner*—Christopher Upton
*Attorney, Agent, or Firm*—Jacobson, Price, Holman & Stern, PLLC

[57] ABSTRACT

A solid-liquid separator comprising a first roller disposed on one side of a tank containing a slurry subjected to solid-liquid separation at such a height that the lower part thereof is immersed in the slurry, and driven rotationally in a direction which enables the slurry attached to its surface to be lifted up and discharged to the outside of the tank; and a second roller disposed above the first roller facing the first roller so that the second roller comes into pressure contact with the slurry attached to the first roller and lifted up so as to remove the liquid from the slurry; as well as a wet flue gas desulfurization apparatus using this solid-liquid separator.

5 Claims, 5 Drawing Sheets

F I G. 2
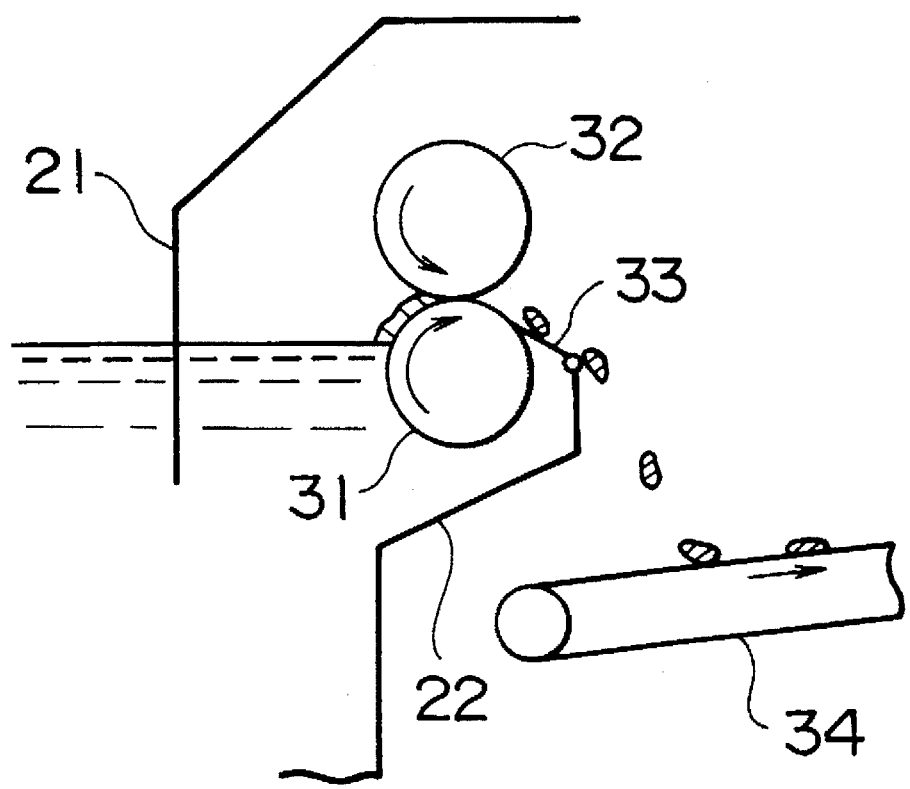

SOLID-LIQUID SEPARATOR AND WET FLUE GAS DESULFURIZATION APPARATUS

BACKGROUND OF THE INVENTION

1. Field of the Invention

This invention relates to a solid-liquid separator of small size and simple construction which is capable of performing solid-liquid separation ad can be directly installed in a tank for forming a slurry subjected to solid-liquid separation, and to a wet flue gas desulfurization system using the same.

2. Description of the Related Art

In recent years, wet desulfurization systems of the so-called tank oxidation type have become popular. In these tank oxidation type systems, the necessity of an oxidation tower is eliminated by supplying air to the tank which is formed as part of an absorption tower so that a slurry (containing calcium compounds such as limestone) having sulfur dioxide absorbed may be oxidized by contact with air in the tank. FIG. 5 is a schematic view illustrating an example of a wet lime-gypsum desulfurization system of this type.

This system includes an absorption tower 1 having a tank 2. This tank 2 is equipped with a stirring rod 4 supported by a hollow shaft 3 and rotated horizontally by a motor (not shown), air supply pipes 5 extending from hollow shaft 3 and having their open ends 5a below stirring rod 4, and a rotary joint 6 for connecting the proximal end of hollow shaft 3 to an air source. By rotating hollow shaft 3, air C is supplied under pressure from air supply pipes 5 to gas-phase areas created on the back side of the rotating stirring rod 4 and the tail ends of these gas-phase areas are subjected to a scattering phenomenon under the action of vortex forces resulting from the rotation of stirring rod 4. Thus, a large number of substantially uniform minute air bubbles are produced, enabling the air to come into efficient contact with the absorbent slurry having sulfur dioxide absorbed therein and form gypsum by complete oxidation of the absorbent slurry.

More specifically, in this system, untreated flue gas A is introduced into a flue gas inlet section 1a of absorption tower 1 and brought into contact with an absorbent slurry injected from header pipes 8 by means of a circulating pump 7 to absorb and remove sulfur dioxide present in untreated flue gas A. The resulting flue gas is discharged as treated flue gas B from a flue gas outlet section 1b. The absorbent slurry injected from header pipes 8 flows downward through packing material 9 while absorbing sulfur dioxide, and enters tank 2 where it is oxidized by contact with a large number of air bubbles produced by the above-described scattering phenomenon while being stirred with stirring rod 4, and then undergoes a neutralization reaction to form gypsum. Predominant reactions occurring in the course of these treatments may be represented by the following reaction formulas (1) to (3).

(Reaction in the absorption tower)

$$SO_2 + H_2O \rightarrow H^+ + HSO_3^- \tag{1}$$

(Reactions in the tank)

$$H^+ + HSO_3^- + \tfrac{1}{2}O_2 \rightarrow 2H^+ + SO_4^{2-} \tag{2}$$

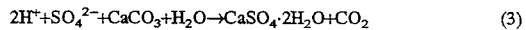

$$2H^+ + SO_4^{2-} + CaCO_3 + H_2O \rightarrow CaSO_4 \cdot 2H_2O + CO_2 \tag{3}$$

Thus, the slurry within tank 2 comes to have suspended therein gypsum and a small amount of limestone used as absorbent. This slurry containing gypsum and limestone is withdrawn by means of a slurry pump 10 and fed to a thickener 11. Using a slurry pump 11a, the resulting concentrate D is fed to a solid-liquid separator 12 where it is filtered and recovered as gypsum E having a low water content (usually of about 10%). On the other hand, the supernatant liquid F from thickener 11 and the filtrate from solid-liquid separator 12 are conveyed to a filtrate tank 13, where limestone G is added and the resulting mixture is recycled to tank 2 as a part of the absorbent slurry by means of a slurry pump 14.

Moreover, in order to maintain a high degree of desulfurization and a high purity of gypsum during operation, the sulfur dioxide concentration in untreated flue gas A and the pH of the slurry within tank 2 are detected with sensors, and the feed rate of limestone and the feed rate of the absorbent slurry are suitably regulated by means of controllers (not shown). The absorbent slurry is fed from a separate limestone slurry tank (not shown).

Thus, in the conventional wet flue gas desulfurization system, solid-liquid separation equipment comprising a plurality of complicated and large sized units such as slurry pumps 10 and 11a, thickener 11, and solid-liquid separator 12 which may comprise a centrifugal separator, a belt filter, a decanter type centrifugal settler or the like is used for the purpose of solid-liquid separation of the gypsum slurry. Moreover, filtrate tank 13 and slurry pump 14 are required to decrease the amount of waste water by reusing the separated water. Consequently, it has been strongly desired to achieve a size reduction and simplification of the equipment required for the solid-liquid separation step and thereby further reduce the size of and the installation space for the wet flue gas desulfurization system.

SUMMARY OF THE INVENTION

Accordingly, it is an object of the present invention to provide a solid-liquid separator of small size and simple construction which is capable of performing solid-liquid separation and can be directly installed in a tank for forming a slurry subjected to solid-liquid separation, and a wet flue gas desulfurization apparatus using the same.

In order to accomplish the above-described object, the present invention provides a solid-liquid separator comprising a first roller disposed on one side of a tank containing a slurry to be subjected to solid-liquid separation at such a height that a lower part thereof is immersed in the slurry, and driven rotationally in a direction which enables the slurry attached to its surface to be lifted up and discharged to an outside of the tank; and a second roller disposed above the first roller so that the second roller comes into pressure contact with the slurry attached onto the first roller and lifted up thereby so as to removed liquid from the slurry.

In one preferred embodiment, the first and second rollers of the solid-liquid separator are installed so as to be vertically movable and the solid-liquid separator further comprises a level controller for raising or lowering the first and second rollers in response to the level of the slurry within the tank.

In another preferred embodiment, the solid-liquid separator further comprises a filter medium disposed at a more outward position of the tank than the first roller so as to receive slurry solids which are delivered while being compressed between the first and second rollers; a washing liquid spray nozzle for spraying a washing liquid over the slurry solids placed on the filter medium; and a third roller disposed in such a position as to cause the third roller to touch the slurry solids placed on the filter medium and wetted with the washing liquid, and driven rotationally in a direction which enables the slurry solids attached to its surface to be lifted up and discharged to an outside of the tank, the third roller being disposed facing the second roller so that the second roller comes into pressure contact with the slurry solids lifted up by the third roller so as to remove the washing liquid from the slurry solids.

The present invention also provides a wet flue gas desulfurization apparatus of tank oxidation type which serves to absorb sulfur dioxide present in the flue gas into the absorbent slurry and oxidize the absorbent slurry to form gypsum as a by-product; which apparatus comprising an absorption tower having in a lower part thereof a tank for receiving an absorbent slurry containing a calcium compound is supplied; a circulating pump for feeding the absorbent slurry within the tank to a flue gas inlet section in an upper part of the absorption tower and bringing the absorbent slurry into contact with flue gas; air supply means for supplying air to the tank for purposes of oxidation; a first roller which is disposed on one side of the tank at such a height that a lower part thereof is immersed in the slurry within the tank and which is driven rotationally in a direction which enables the slurry consisting largely of gypsum and attached onto its surface to be lifted up and discharged to an outside of the tank; and a second roller disposed above the first roller so that the second roller comes into pressure contact with the slurry attached to the first roller and lifted up thereby, so as to remove water from the slurry.

In one preferred embodiment, the wet flue gas desulfurization apparatus is characterized in that the first and second rollers are installed so as to be vertically movable and the desulfurization apparatus further comprises a level controller for raising or lowering the first and second rollers in response to the level of the slurry within the tank.

In another preferred embodiment, the wet flue gas desulfurization apparatus further comprises a filter medium disposed at a more outward position of the tank than the first roller so as to receive the slurry solids which consist largely of gypsum and are delivered while being compressed between the first and second rollers; a washing liquid spray nozzle for spraying a washing liquid over the slurry solids placed on the filter medium; and a third roller disposed in such a position as to cause the third roller to touch the slurry solids placed on the filter medium and wetted with the washing liquid, and driven rotationally in a direction which enables the slurry solids attached to its surface to be lifted up and discharged to the outside of the tank, the third roller being disposed facing the second roller so that the second roller comes into pressure contact with the slurry solids lifted up by the third roller so as to remove the washing liquid from the slurry solids.

In the present invention, a portion of the slurry within the tank adheres to the surface of the lower part of the first roller. With the rotation of this first roller, the slurry attached to the first roller is lifted up and discharged to the outside of the tank. During this process, the liquid present in the slurry is squeezed out by the action of gravity and by compression of the slurry between the first and second rollers, thus flowing downward and returning to the tank. Consequently, only the solids present in the slurry are carried while being compressed between the first and second rollers, and discharged to the outside of the tank. Thus, solid-liquid separation can be performed by using a solid-liquid separator which has a very simple construction and can be directly connected to the tank.

Especially where the solid-liquid separator is equipped with a level controller for raising or lowering the first and second rollers in response to the level of the slurry present in the tank, efficient solid-liquid separation can be performed by positioning the first roller at an optimum height, in spite of changes in the level of the slurry within the tank.

Furthermore, where the solid-liquid separator is equipped with a filter medium for receiving the slurry solids delivered by the first roller and the like, a washing liquid spray nozzle for spraying a washing liquid over the slurry solids placed on the filter medium, and a third roller which rotates while touching the slurry solids placed on the filter medium and wetted with the washing liquid and which serves to discharge the slurry solids to the outside of the tank, the slurry solids are washed after delivered by the first roller and the like, and the washing liquid is removed by delivering the slurry solids while compressing them again between the third and second rollers. Thus, the solid-liquid separator of simple construction which consists essentially of three rollers makes it possible to perform not only solid-liquid separation but also washing of the solids, and hereby obtain highly pure solids free of liquid and impurities.

BRIEF DESCRIPTION OF THE DRAWINGS

FIG. 2 is an enlarged fragmentary view of the apparatus of FIG. 1, illustrating an essential part thereof including a solid-liquid separator and its surroundings;

DETAILED DESCRIPTION OF THE PREFERRED EMBODIMENTS

Figure 5:
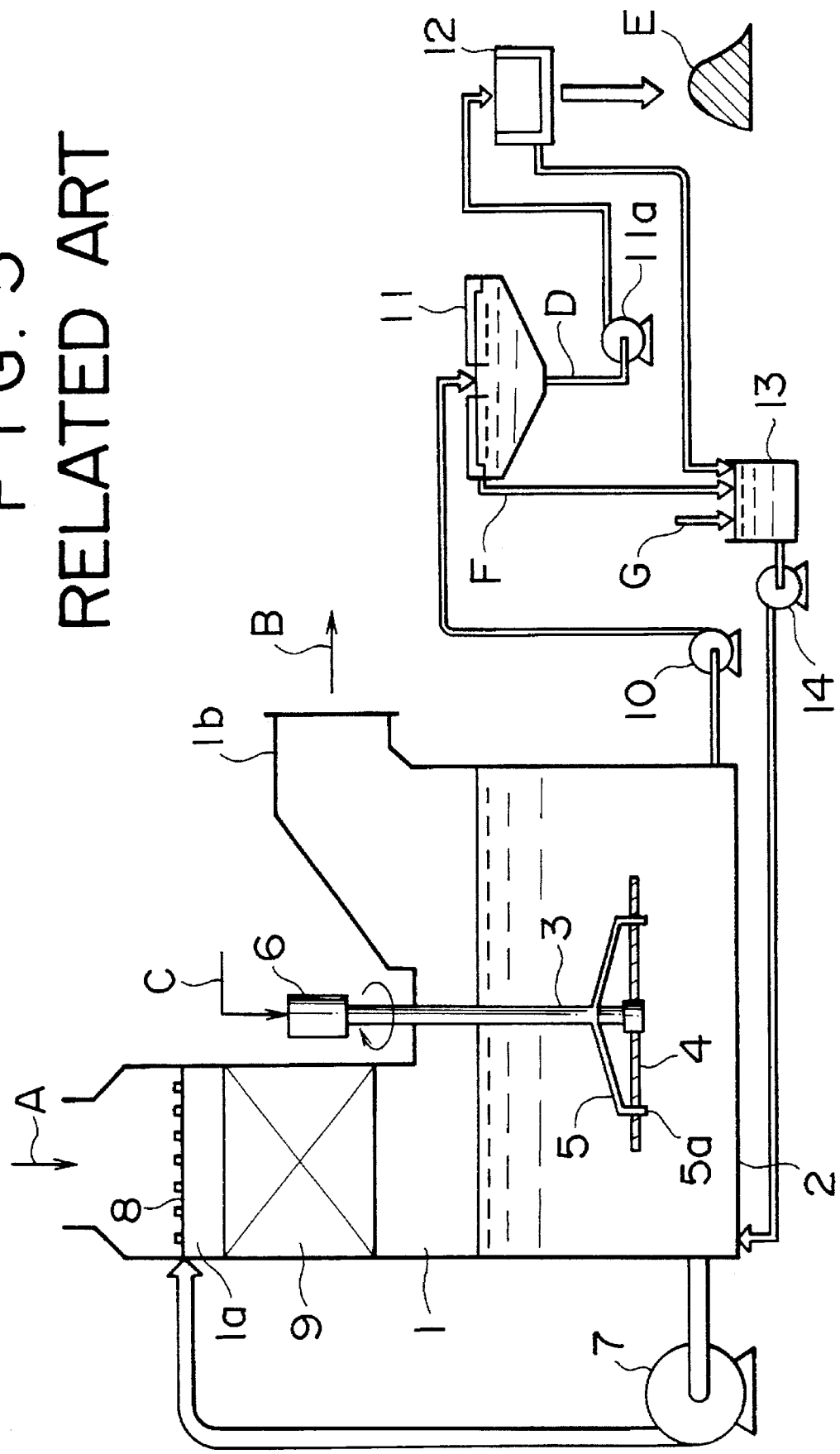
FIG. 5 is a schematic view illustrating the overall construction of an example of a conventional wet flue gas desulfurization system.

Preferred embodiments of the present invention are more specifically described with reference to the accompanying drawings. In the following description, the same elements as described above in connection with the conventional wet flue gas desulfurization system of FIG. 5 are designated by the same reference numerals, and the explanation thereof is omitted or simplified.

(First Embodiment)

Figure 1:
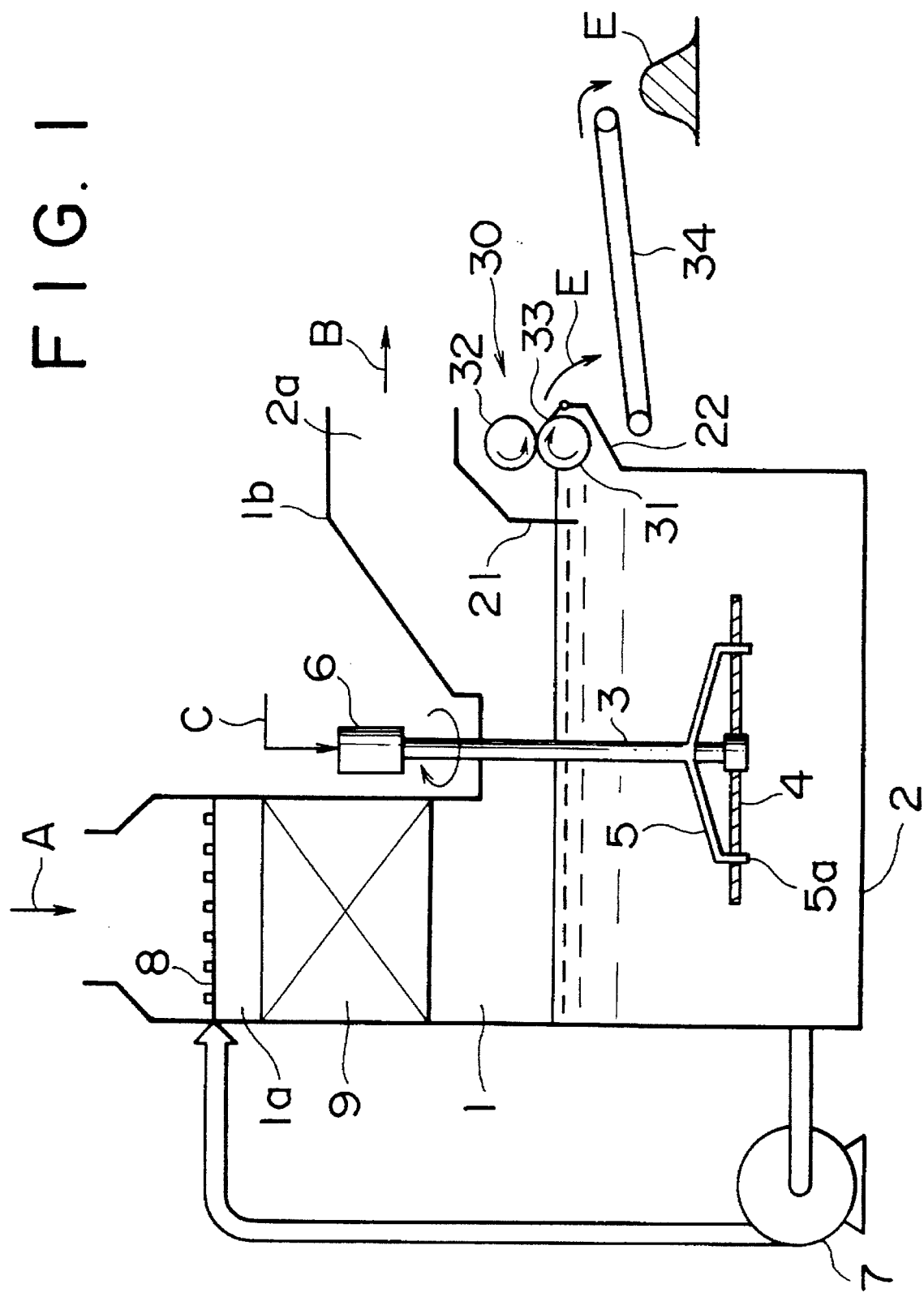
FIG. 1 is a schematic view illustrating the overall construction of a wet flue gas desulfurization apparatus in accordance with a first embodiment of the present invention.

FIGS. 1 and 2 illustrate a wet flue gas desulfurization apparatus using a solid-liquid separator in accordance with a first embodiment of the present invention. As can be seen in FIG. 1, a solid-liquid separating section 22 is defined laterally to a flue gas outlet section 1b of a tank 2 and isolated from a flue gas discharge duct 2a by a partition wall 21. A solid-liquid separator 30 is installed in this solid-liquid separating section 22.

As illustrated in FIG. 2, solid-liquid separator 30 consists essentially of a first roller 31 and a second roller 32. First roller 31 is disposed at such a height that the lower part thereof is immersed in the slurry, and driven rotationally by a motor (not shown) in a direction which enables the slurry attached to its surface to be lifted up and discharged to the outside of tank 2 (i.e., clockwise in the embodiment illustrated in FIGS. 1 and 2). Second roller 32 is disposed above first roller 31 facing the first roller, supported rotatably, and positioned with a predetermined gap between first roller 31 and second roller 32 so that second roller 32 comes into pressure contact with the slurry attached to first roller 31 and lifted up thereby.

Second roller 32 may be designed so that it is driven by first roller 31 or so that it is driven counterclockwise (in the embodiment illustrated in FIGS. 1 and 2) to rotate synchronously with first roller 31. Moreover, second roller 32 need not be supported at a fixed position with respect to first roller 31, but may be supported on a rotating shaft to which force is applied so as to cause second roller 31 to be pressed against first roller 31. Furthermore, in this embodiment, solid-liquid separator 30 is equipped with a guide plate 33 extending from the solid-liquid separating section 22 of tank 2 and having a tip in sliding contact with the circumferential surface of first roller 31 on its discharge side, so that the slurry attached to the surface of first roller 31 is scraped off and guided so as to fall on a belt conveyor 34.

Now, the operation of the wet flue gas desulfurization apparatus constructed in the above-described manner is explained below. When an absorbent slurry containing limestone is fed from a limestone slurry tank (not shown) to tank 2, the desulfurization of flue gas and the formation of gypsum are performed on the basis of the aforementioned functions of circulating pump 7 and stirring rod 4, just as described previously in connection with the conventional wet flue gas desulfurization apparatus. As a result, the slurry within tank 2 comes to have suspended therein gypsum (at a concentration of about 30 wt. % or less) and a small amount of limestone used as absorbent. In solid-liquid separator 30, a portion of the slurry consisting largely of gypsum adheres to first roller 31. With the rotation of first roller 31, this slurry is lifted up and discharged to the outside of tank 2. During this process, the liquid (mainly water) present in the slurry is squeezed out by the action of gravity and by compression of the slurry between first roller 31 and second roller 32, thus flowing downward and returning to tank 2. Consequently, as illustrated in FIG. 2, only the solids present in the slurry are delivered while being compressed between first roller 31 and second roller 32, discharged on belt conveyor 34 by way of guide plate 33, and recovered as gypsum E (having a gypsum concentration of about 90 wt. % or greater).

Thus, the apparatus in accordance with this embodiment enables gypsum E having a low water content to be recovered by using the solid-liquid separator 30 which has a very simple construction and is directly connected to tank 2. This makes it possible to eliminate the necessity of many complicated and large-sized units such as conventional slurry pumps, thickeners and solid-liquid separators, and thereby achieve a substantial reduction in cost and installation space.

(Second embodiment)

Figure 3:
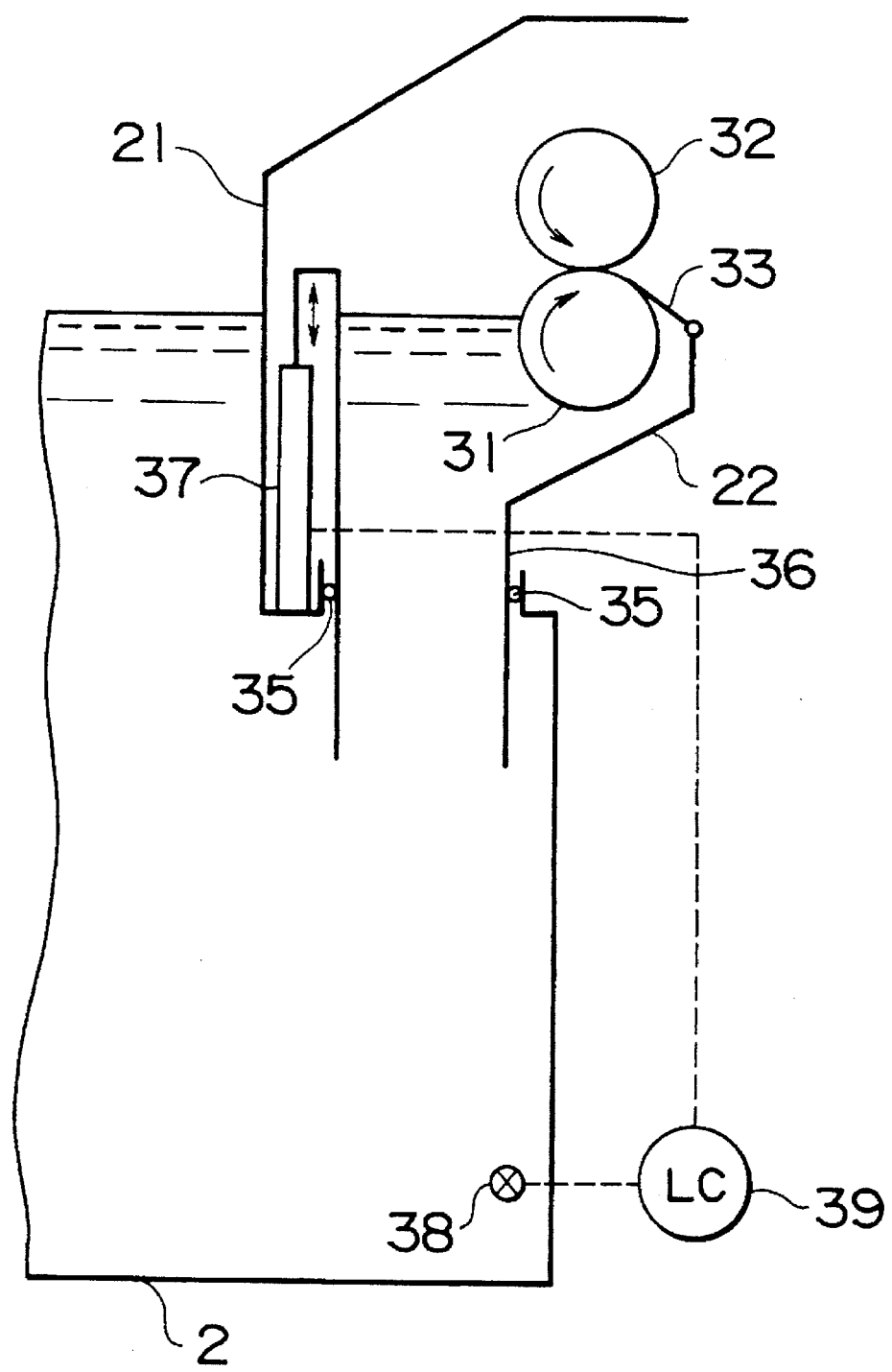
FIG. 3 is an enlarged fragmentary view of a wet flue gas desulfurization apparatus in accordance with a second embodiment of the present invention, illustrating an essential part thereof including a solid-liquid separator and its surroundings.

Next, a wet flue gas desulfurization apparatus using a solid-liquid separator in accordance with a second embodiment of the present invention is described with reference to FIG. 3. In this second embodiment, solid-liquid separating section 22 is defined at the top of an elevator section 36 which is mounted on tank 2 through the medium of a seal 35 so as to be vertically movable. In this solid-liquid separating section 22, first roller 31, second roller 32 and guide plate 33 are installed in the same manner as in the first embodiment. Elevator section 36 is driven by a driving means 37 comprising, for example, a hydraulic cylinder and this driving means 37 is controlled by a level control 39 on the basis of the output of a level sensor 38 for detecting the level of the slurry within tank 2.

More specifically, level control 39 performs servo control of the vertical position of elevator section 36 by controlling driving means 37 with the aid of a hydraulic servo valve (not shown) or the like while detecting the vertical position of elevator section 36 by means of a position detector (not shown) such as potentiometer, so that the optimum relative height of the slurry surface with respect to first roller 31 is always secured. Thus, in spite of changes in the level of the gypsum slurry within tank 2, first roller 31 can be positioned at an optimum height to achieve efficient separation (and collection) of gypsum.

(Third embodiment)

Next, a wet flue gas desulfurization apparatus using a solid-liquid separator in accordance with a third embodiment of the present invention is described with reference to FIG. 4. The apparatus in accordance with this embodiment functions not only to separate gypsum from a slurry, but also to remove impurities (such as chlorine that is contained abundantly in, for example, flue gas from refuse disposal facilities) from gypsum obtained as a by-product. Since chlorine is detrimental in that it stains products (such as gypsum plaster boards and cement) made of gypsum obtained as a by-product or in that it causes corrosion of the iron reinforcing rods of buildings, it is necessary to minimize its content.

In this embodiment, a washing section 23 is defined on the outside of the solid-liquid separating section 22 of tank 2, and a filter medium 40, a third roller 41, a guide plate 42 and a washing liquid spray nozzle 43 are installed in this washing section 23. Filter medium 40 receives the gypsum which is delivered while being compressed between first roller 31 and second roller 32 and while being guided by guide plate 33, and allows only the washing liquid (water in this case) to pass therethrough. Washing liquid spray nozzle 43 is a nozzle for spraying a washing liquid (i.e., water) over the gypsum placed on filter medium 40, and pressurized water is supplied thereto by means of a pump (not shown). Third roller 41 is disposed in such a position as to cause third roller 41 to touch the gypsum placed on filter medium 40 and wetted with the washing liquid while facing second roller 32 with a predetermined gap therebetween and being driven rotationally clockwise. Guide plate 42 extends from washing section 23 and has a tip in sliding contact with the circumferential surface of third roller 41 on its discharge side, so that the gypsum attached to the surface of third roller 41 is scraped off and guided so as to fall on a belt conveyor (not shown).

Figure 4:
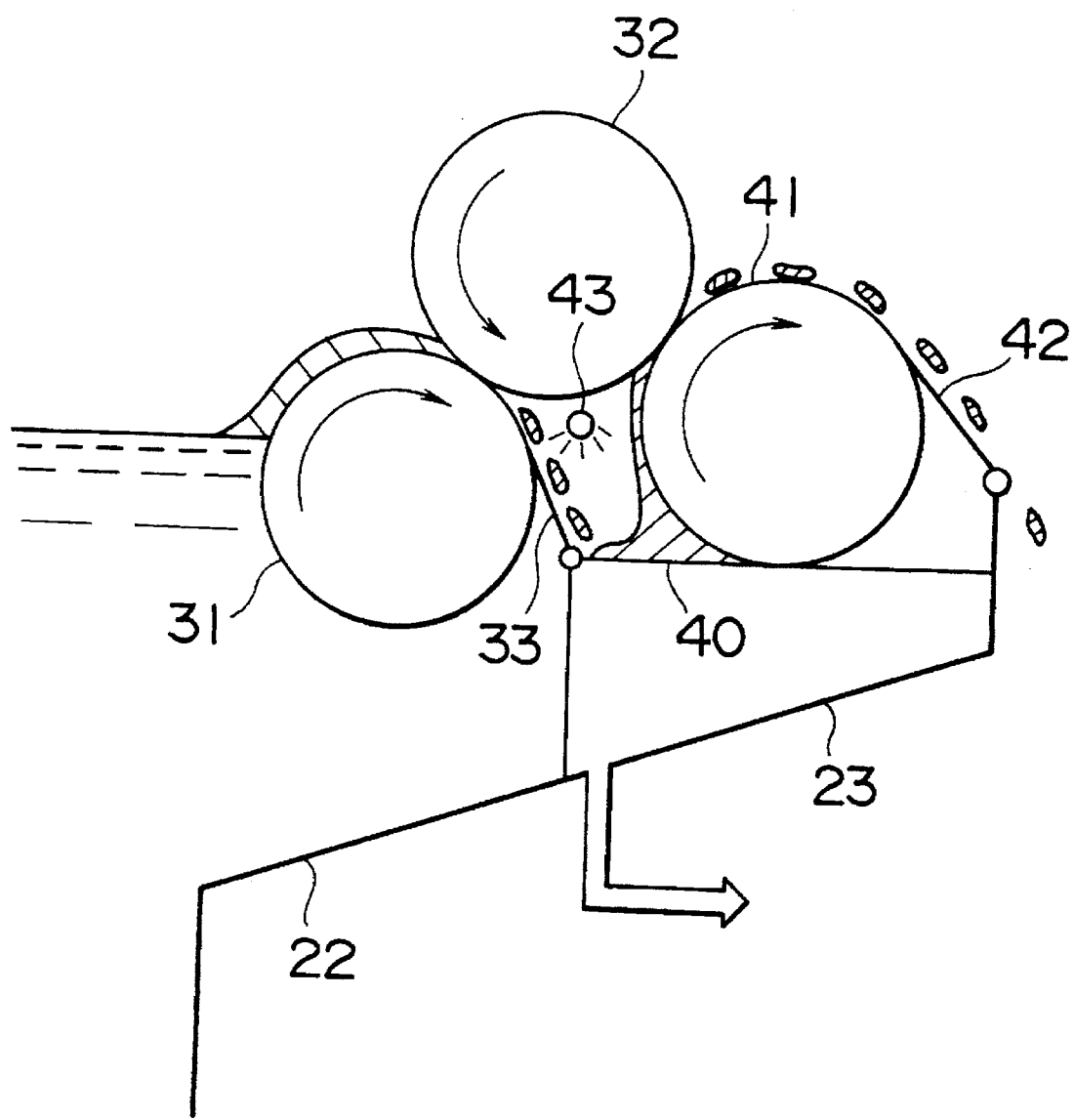
FIG. 4 is an enlarged fragmentary view of a wet flue gas desulfurization apparatus in accordance with a third embodiment of the present invention, illustrating an essential part thereof including a solid-liquid separator and its surroundings.

In this embodiment, as can be seen in FIG. 4, the gypsum delivered by first roller 31 and the like is washed by spraying water thereover, and this washing liquid (or water) is then removed by delivering the gypsum while compressing it again between third roller 41 and second roller 32. Consequently, the solid-liquid separator of simple construction which consists essentially of three rollers makes it possible not only to perform the separation of gypsum, but also to obtain gypsum of good quality in which the content of impurities such as chlorine (usually present in an mount of 10,000 ppm) has been reduced to a chlorine content of 100 ppm or less). The water which has been sprayed from washing liquid spray nozzle 43 and has passed through filter medium 40 while absorbing chlorine and other impurities may be withdrawn, for example, from the bottom of washing section as illustrated in FIG. 4.

It is to be understood that the solid-liquid separator of the present invention is not limited to the above-described use for solid-liquid separation in wet flue gas desulfurization apparatuses of the tank oxidation type, but can also be used in various fields of application requiring the separation of solids from a slurry.

It is evident from the above description that, according to the present invention, solid-liquid separation can be performed by using a solid-liquid separator which has a very simple construction and can be directly connected to a tank for forming a slurry subjected to solid-liquid separation. This makes it possible to eliminate the necessity of complicated and large-sized units such as slurry pumps, thickeners and centrifugal separators, and thereby achieve a substantial reduction in the cost and installation space of the solid-liquid separator. Accordingly, the wet flue gas desulfurization apparatus using this solid-liquid separator can also achieve a substantial reduction in cost and installation space, thus contributing to the popularization of desulfurization apparatuses and an increase of demand therefor.

Especially where the solid-liquid separator is equipped with a level controller for raising or lowering the first and second rollers in response to the level of the slurry within the tank, efficient solid-liquid separation can be performed by positioning the first roller at an optimum height, in spite of changes in the level of the slurry within the tank. Consequently, not only a reduction in cost and installation space can be achieved, but also easy operating conditions of the apparatus and high reliability of its operation can be secured.

Furthermore, where the solid-liquid separator is equipped with a filter medium for receiving the slurry solids delivered by the first roller and the like, a washing liquid spray nozzle for spraying a washing liquid over the slurry solids placed on the filter medium, and a third roller which rotates while touching the slurry solids placed on the filter medium and wetted with the washing liquid and which functions to discharge the slurry solids to the outside of the tank, the solid-liquid separator of simple construction which consists essentially of three rollers and can also be connected directly to the tank makes it possible to perform not only solid-liquid separation but also washing of the solids, and thereby obtain highly pure solids freed of liquid and impurities. Accordingly, the wet flue gas desulfurization apparatus using this solid-liquid separator can produce highly concentrated gypsum of good quality and freed of chlorine and other impurities in a small space and at a low cost, thus contributing to further popularization of desulfurization apparatuses and a further increase of demand therefor.

We claim:

1. A wet flue gas desulfurization apparatus of the tank oxidation type for absorbing sulfur dioxide present in a flue gas into an absorbent slurry and for oxidizing the spent absorbent slurry to form gypsum as a by-product, said apparatus comprising an absorption tower having in a lower part thereof a tank for receiving an absorbent slurry containing a calcium compound; a circulating pump for feeding the absorbent slurry within said tank to a flue gas inlet section in an upper part of said absorption tower and bringing the absorbent slurry into contact with the flue gas; air supply means for supplying air to said tank for purposes of oxidation; a first roller disposed on one side of said tank with a lower part thereof immersed in slurry present in said tank, for lifting slurry from the tank, when rotated, by adherence of the slurry to an outer surface of the first roller, and a second roller disposed above said first roller and facing said first roller for removing water from the slurry adhering to the first roller by pressure contact of the second roller with the first roller thereby forming slurry solids.

2. The wet flue gas desulfurization apparatus as claimed in claim 1, wherein said first and second rollers are vertically movable and said wet flue gas desulfurization apparatus further comprises a level controller for raising or lowering said first and second rollers in response to the level of the slurry in said tank.

3. The wet flue gas desulfurization apparatus as claimed in claim 1, wherein said wet flue gas desulfurization apparatus further comprises a filter medium disposed in a more outward position of said tank than said first roller for receiving the slurry solids from between said first and second rollers; a washing liquid spray nozzle for spraying a washing liquid over the slurry solids on the filter medium; and a third roller for lifting the wetted slurry solids from the filter medium by adherence of the wetted slurry solids to an outer surface of the third roller and for discharging the slurry solids from the tank, the third roller being in pressure contact with the second roller for removal of washing liquid from the slurry solids by the second roller.

4. A solid-liquid separator for a slurry contained in a tank comprising a first roller located in the tank for lifting slurry from the tank when the roller is rotated, by adherence of the slurry to an outer surface of the first roller, a second roller above the first roller and in pressure contact therewith for removing liquid from the slurry adhering to the first roller and producing slurry solids, a filter medium for receiving the slurry solids from between the first and second rollers, a washing liquid spray nozzle for spraying the slurry solids on the filter medium with washing liquid to wet the slurry solids and a third roller for lifting the wetted slurry solids from the filter medium by adherence of the wetted slurry solids to an outer surface of the third roller and for discharging the slurry solids from the tank, the third roller being in pressure contact with the second roller for removal of washing liquid from the slurry solids by the second roller.

5. A separator as claimed in claim 4 wherein the first and second rollers are vertically movable and the separator further comprises a level controller for raising the first and second rollers in accordance with the level of slurry in the tank.

* * * * *